United States Patent
Boscolo et al.

(10) Patent No.: US 7,078,871 B2
(45) Date of Patent: Jul. 18, 2006

(54) METHOD FOR DETERMINING THE EFFECTIVE RESISTANCE OF A DC MOTOR AND OPEN LOOP VOLTAGE MODE CONTROLLING OF A DC MOTOR

(75) Inventors: Michele Boscolo, Sottomarina (IT); Paolo Capretta, Longmont, CO (US)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 11/058,801

(22) Filed: Feb. 16, 2005

(65) Prior Publication Data

US 2005/0189893 A1    Sep. 1, 2005

(30) Foreign Application Priority Data

Feb. 17, 2004    (IT)    .................... VA2004A0010

(51) Int. Cl.
*H02P 1/00*    (2006.01)
(52) U.S. Cl. .................... 318/270; 388/825; 388/833

(58) Field of Classification Search ................ 318/270, 318/560; 364/426.01; 388/825, 833, 840, 388/848, 854
See application file for complete search history.

(56) References Cited

U.S. PATENT DOCUMENTS

| | | | |
|---|---|---|---|
| 5,465,208 A | * | 11/1995 | Mochizuki et al. ............ 701/70 |
| 5,675,219 A | * | 10/1997 | Helfrich ........................ 315/8 |
| 6,617,817 B1 | | 9/2003 | Hill .............................. 318/560 |

* cited by examiner

*Primary Examiner*—Karen Masih
(74) *Attorney, Agent, or Firm*—Lisa K. Jorgenson; Allen, Dyer, Doppelt, Milbrath & Gilchrist, P.A.

(57) ABSTRACT

A method for determining an effective resistance of a voltage controlled DC motor having a nominal resistance includes driving the DC motor with a signal so that the DC motor has a targeted acceleration, and sensing an effective acceleration of the DC motor. The effective resistance of the DC motor is determined as a function of the nominal resistance, the targeted acceleration and the effective acceleration.

16 Claims, 2 Drawing Sheets

METHOD FOR DETERMINING THE EFFECTIVE RESISTANCE OF A DC MOTOR AND OPEN LOOP VOLTAGE MODE CONTROLLING OF A DC MOTOR

FIELD OF THE INVENTION

The present invention relates in general to the control of electric motors, and more particularly, to a method for determining the effective resistance of a DC motor, such as a voice coil motor (VCM), and a related voltage mode driving of the VCM.

BACKGROUND OF THE INVENTION

In many applications it is necessary to drive DC motors with great precision. Electric motors are inductive loads, and there is a certain time lag between a variation in the current circulating in the motor winding and the corresponding voltage variation at the terminals of the motor. The value of the voltage is a function of a certain electrical time constant of the motor. This delay may lead to relevant errors in positioning devices moved by the motor.

An important application requiring a precise driving of a motor is that in which voice coil motors (VCM) are used for moving read/write heads of a hard disk drive over the surface of the spinning disk. Voice coil motors are employed in a number of applications, and hereinafter, reference will be made to this type of motor. The considerations that will be made also hold even for other types of DC motors.

Commonly, voice coil motors are controlled in a current mode by a common feedback loop composed of a sensing resistor connected in series to the winding of the motor, and of a control circuit input with the voltage present on the sensing resistor. A control signal is output to a power stage connected to the winding of the motor to make null the difference between the current effectively flowing in the motor winding and the programmed driving current.

Drawbacks to this type of driving include the sensing resistor being very precise for minimizing errors in driving the motor. The sensing resistor is a relatively expensive external component that needs to be connected to the integrated motor controller.

With the ever increasing scale of integration of integrated circuits and the relative small footprint packages, there are cost penalties associated with the total number of pins to be formed. Forming pins for implementing a feedback current mode control implies a non-negligible cost, especially for mass production.

An open-loop voltage mode control is an alternative to the more common current mode closed loop control. The open-loop voltage mode control has the advantage of reducing the total pin count because a dedicated pin for the sensing resistor is no longer required.

In an open-loop voltage mode control, the delay due to the electrical time constant of the motor may be compensated by using the method of driving a voice coil motor and the related circuit as disclosed in U.S. Pat. No. 6,617,817. This patent is in the name of the current assignee of the present invention, and is incorporated herein by reference in its entirety. The '817 patent discloses the use of a compensation filter for correcting the signal that is input to the output power stage that drives the motor as a function of the nominal value of the admittance of the motor. A basic scheme of this driving circuit is shown in FIG. 1.

The admittance of the motor varies during operation because the motor heats up, and thus the winding resistance increases with the temperature. As a consequence, the driving signal may be corrected in an insufficiently accurate manner if the winding resistance differs from its nominal design value.

One approach is to modify the parameters that define the compensation filter for adjusting them according to the varying resistance. This could be done practically by determining the effective resistance of the motor winding by measuring the current flowing in the winding. However, this would defeat the reason for choosing the voltage mode open-loop approach.

SUMMARY OF THE INVENTION

In view of the foregoing background, an object of the present invention is to provide a method for determining the effective resistance of an open-loop voltage mode controlled DC motor without measuring the current flowing in the motor.

This may be accomplished with a satisfactory precision by driving the motor with a voltage corresponding to a certain acceleration to be imparted, calculated on the basis of the nominal value of the motor resistance, and by detecting the value of the acceleration that is effectively imparted. By comparing the two acceleration values, it is possible to infer by how much the effective resistance differs from the nominal resistance of the motor.

Therefore, a main objective of the present invention is to provide a method for determining the effective resistance of a voltage controlled DC motor having a certain nominal resistance. The method comprises the steps of driving the motor with a signal to generate a certain acceleration according to the nominal electrical and mechanical parameters of the motor, and sensing the effective acceleration of the motor. The effective resistance of the motor is determined as a function of the nominal resistance of the motor, of the certain acceleration and of the sensed acceleration.

The determination of the motor resistance is then exploited for the open loop controlling in the voltage mode with an enhanced precision by correcting the driving signal of the output power stage of the motor controller. The correction is actuated by regulating the parameters that define the signal transfer function, such as the DC gain or the position of the poles and zeros. The correction compensates for eventual differences between the nominal resistance and the effective resistance of the motor that may develop during operation because of temperature changes.

The present invention also provides a motor control circuit for implementing the method of the invention. The motor control circuit may comprise a compensation filter with adjustable parameters for compensating the driving signal of the output power stage, and a regulating circuit that determines the effective resistance of the motor and adjusts the parameters of the compensation filter.

BRIEF DESCRIPTION OF THE DRAWINGS

The various features and advantages of the present invention will become even more evident through a detailed description referring to the attached drawings, wherein.

DETAILED DESCRIPTION OF THE PREFERRED EMBODIMENTS

The method for determining the effective resistance of a DC motor in accordance with the present invention is based upon the assumption that the main cause of variation of the current absorbed by a motor includes the variability of its resistance. Variations of other parameters are negligible, as it is substantially verified in practice.

Figure 2:
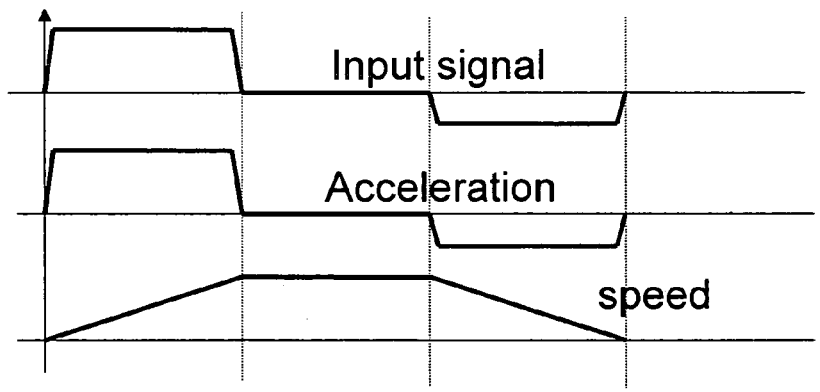
FIG. 2 shows diagrams of the driving signal, and the resulting acceleration and speed of the motor according to the present invention.
Figure 3:
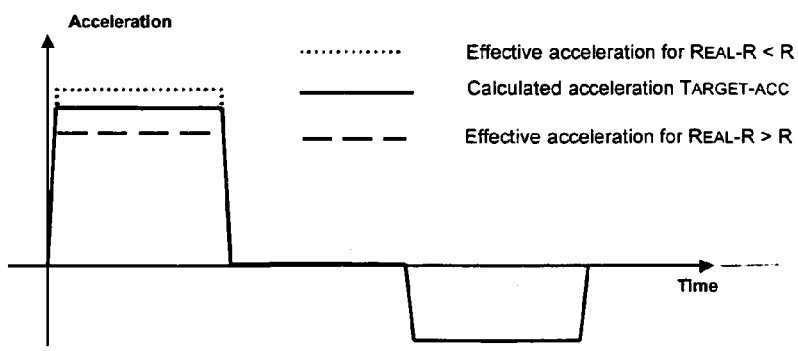
FIG. 3 compares the acceleration of the motor when the effective resistance differs from the nominal design resistance with the acceleration of the motor when the effective resistance is identical to the normal design value.

Let $T_{ARGET-ACC}$ be a certain (expected or calculated) acceleration i.e. targeted acceleration, that should be imparted to the motor by a driving signal INPUT SIGNAL, as shown in FIG. 2. The value of the driving signal INPUT SIGNAL is calculated as a function of the nominal resistance of the motor and of other electrical and mechanical parameters for obtaining the acceleration $T_{ARGET-ACC}$. Generally, an effective acceleration of the motor that is different from the one expected is detected, as depicted in FIG. 3.

It has been demonstrated that this difference is essentially due to the fact that the effective resistance of the motor differs from its nominal value during the operation of the motor. This is mainly because the windings of the motor warm up. In contrast, the inductance L and the speed constant Kt of the motor show limited variations during operation and have substantially negligible effects.

As a consequence, the current flowing in the motor, and thus the acceleration imparted to the rotor, are approximately inversely proportional to the effective resistance $R_{EAL}-R$. As shown in FIG. 3, if the effective resistance $R_{EAL}-R$ is smaller than the nominal resistance R. The imparted acceleration to the rotor exceeds the expected acceleration $T_{ARGET-ACC}$, and vice-versa in the opposite case.

According to a preferred embodiment, the effective resistance $R_{EAL}-R$ is determined by multiplying the nominal resistance R by the ratio between the expected (calculated) acceleration $T_{ARGET-ACC}$ and the detected acceleration $R_{EAL-ACC}$:

$$R_{EAL}-R = R * T_{ARGET-ACC}/R_{EAL-ACC}$$

The above formula is based on the assumption that the difference between the expected acceleration $T_{ARGET-ACC}$ and the effectively or detected imparted acceleration $R_{EAL-ACC}$ is entirely due in a first approximation to a variation of the resistance of the windings of the motor. The method permits determination of the value of the effective resistance of the motor with a sufficient approximation for driving with satisfactory precision a voice coil motor of a hard disk drive.

Of course, the method may be perfected by considering also the possible variations of other parameters of the motor, such as the inductance L and the speed constant Kt. This may be done, for instance, by multiplying the resistance value that is calculated with the above formula by a correction factor that will depend on values of other parameters of the individual motor.

The method may be conveniently used in an open-loop voltage mode controlling a DC motor for automatically adjusting the parameters of the compensation filter as a function of the measured value of the effective resistance of the motor. For example, it is possible to increase the gain of the filter proportionally to the effective resistance of the motor, or the poles and/or zeros of the filter may be fixed for compensating with an enhanced accuracy the zeros and/or poles of the motor under the current conditions of operation.

Figure 1:
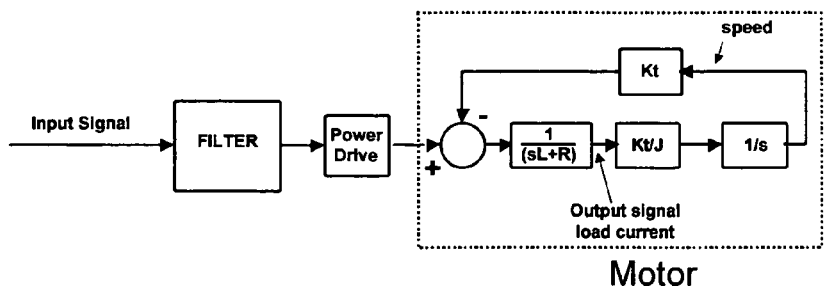
FIG. 1 shows a driving circuit of a DC motor according to the prior art.
Figure 4:
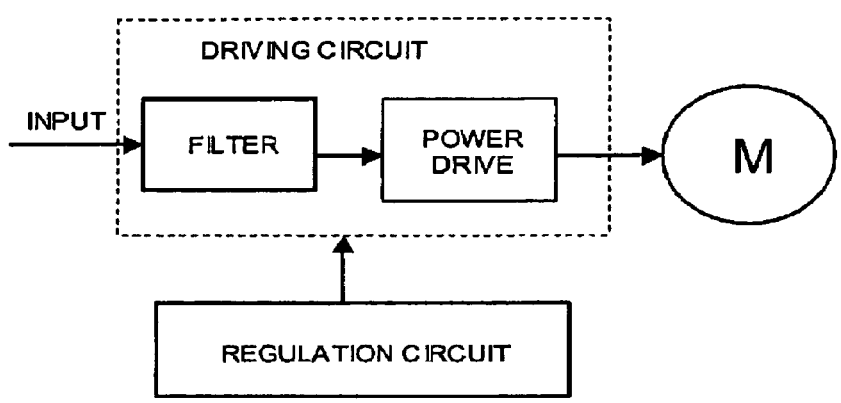
FIG. 4 is a block diagram of a driving circuit and additional regulation circuit according to the present invention.

The method for controlling the motor is implemented by providing the driving circuit of FIG. 1 with an additional regulation circuit (FIG. 4). The additional regulation circuit cooperates with the driving circuit for determining the effective resistance of the motor, and regulates the parameters of the filter FILTER for compensating eventual differences between the nominal design resistance and the effective resistance of the motor.

That which is claimed is:

1. A method for determining an effective resistance of a voltage controlled DC motor having a nominal resistance, the method comprising:
    driving the voltage controlled DC motor to have a targeted acceleration;
    sensing an effective acceleration of the voltage controlled DC motor; and
    determining the effective resistance of the voltage controlled DC motor as a function of the nominal resistance, the targeted acceleration and the effective acceleration.

2. A method according to claim 1, wherein the effective resistance is based upon a product between the nominal resistance and a ratio between the targeted acceleration and the effective acceleration.

3. A method for controlling in an open-loop voltage mode a voltage controlled DC motor having a nominal resistance, the voltage controlled DC motor including an output stage coupled thereto, the method comprising:
    driving the voltage controlled DC motor with a signal to have a targeted acceleration, the signal having a transfer function associated therewith and being applied as an input to the output power stage;
    sensing an effective acceleration of the voltage controlled DC motor;
    determining an effective resistance of the voltage controlled DC motor as a function of the nominal resistance, the targeted acceleration and the effective acceleration; and
    adjusting at least one parameter of the transfer function to compensate for a differences between the nominal resistance and the effective resistance of the voltage controlled DC motor.

4. A method according to claim 3, wherein the adjusting comprises regulating a DC gain proportional to the effective resistance.

5. A method according to claim 3, wherein the adjusting comprises positioning poles and zeros of the transfer function based upon the effective resistance.

6. A method according to claim 3, wherein the effective resistance is based upon a product between the nominal resistance and a ratio between the targeted acceleration and the effective acceleration.

7. A circuit for controlling in an open-loop voltage mode a voltage controlled DC motor having a nominal resistance associated therewith, the circuit comprising:
    a driving circuit coupled to said compensation filter for driving the voltage controlled DC motor to have a targeted acceleration, and comprising
    an output power stage coupled to the DC motor,
    a compensation filter with at least one adjustable parameter coupled to said output power stage; and
    a regulation circuit for determining an effective resistance of the voltage controlled DC motor by
    sensing an effective acceleration of the voltage controlled DC motor, and determining an effective resistance of the voltage controlled DC motor as a function of the nominal resistance, the targeted acceleration and the effective acceleration.

8. A circuit according to claim 7, wherein the signal provided by said driving circuit has a transfer function associated therewith; and wherein said regulation circuit adjust at least one parameter of the transfer function to compensate for a difference between the nominal resistance and the effective resistance of the voltage controlled DC motor.

9. A circuit according to claim 8, wherein the adjusting comprises regulating a DC gain proportional to the effective resistance.

10. A circuit according to claim 8, wherein the adjusting comprises positioning poles and zeros of the transfer function based upon the effective resistance.

11. A circuit according to claim 7, wherein the effective resistance is based upon a product between the nominal resistance and a ratio between the targeted acceleration and the effective acceleration.

12. A circuit for controlling a voltage controlled DC motor having a nominal resistance associated therewith, the circuit comprising:

a driving circuit for driving the voltage controlled DC motor to have a targeted acceleration; and a regulation circuit for determining an effective resistance of the voltage controlled DC motor by sensing an effective acceleration of the voltage controlled DC motor, and determining an effective resistance of the voltage controlled DC motor as a function of the nominal resistance, the targeted acceleration and the effective acceleration.

13. A circuit according to claim 12, wherein the signal provided by said driving circuit has a transfer function associated therewith; and wherein said regulation circuit adjust at least one parameter of the transfer function to compensate for a difference between the nominal resistance and the effective resistance of the voltage controlled DC motor.

14. A circuit according to claim 13, wherein the adjusting comprises regulating a DC gain proportional to the effective resistance.

15. A circuit according to claim 13, wherein the adjusting comprises positioning poles and zeros of the transfer function based upon the effective resistance.

16. A circuit according to claim 12, wherein the effective resistance is based upon a product between the nominal resistance and a ratio between the targeted acceleration and the effective acceleration.

* * * * *

UNITED STATES PATENT AND TRADEMARK OFFICE
CERTIFICATE OF CORRECTION

PATENT NO. : 7,078,871 B2 Page 1 of 1
APPLICATION NO. : 11/058801
DATED : July 18, 2006
INVENTOR(S) : Boscolo et al.

It is certified that error appears in the above-identified patent and that said Letters Patent is hereby corrected as shown below:

Column 3, Line 48

Delete: "or detected imparted"

Insert: -- imparted or detected --

Signed and Sealed this

Twenty-seventh Day of February, 2007

JON W. DUDAS
*Director of the United States Patent and Trademark Office*